United States Patent [19]

Uemura

[11] Patent Number: 5,010,298

[45] Date of Patent: Apr. 23, 1991

[54] VARIABLE INDUCTANCE DISPLACEMENT MEASURING DEVICE WITH SLIDABLE METAL SLEEVE AND FERRITE BEAD CORE

[75] Inventor: Saburo Uemura, Yokohama, Japan

[73] Assignee: Macome Corporation, Tokyo, Japan

[21] Appl. No.: 371,742

[22] Filed: Jun. 26, 1989

[30] Foreign Application Priority Data

Oct. 27, 1988 [JP] Japan .................. 63-271434

[51] Int. Cl.⁵ .................. G01B 7/14; G08C 19/08; H01F 27/24
[52] U.S. Cl. .................. 324/207.19; 324/207.24; 324/234; 336/45; 336/175; 336/212; 340/870.35
[58] Field of Search .......... 324/207, 208, 234, 207.18, 324/207.19, 207.24; 340/870.31–870.36; 336/175, 212, 233, 45

[56] References Cited

U.S. PATENT DOCUMENTS

| | | | |
|---|---|---|---|
| 3,491,289 | 1/1970 | Petrini | 324/208 |
| 3,614,694 | 10/1971 | Koontz | 336/175 X |
| 3,654,549 | 4/1972 | Maurer et al. | 340/870.31 X |
| 3,891,918 | 6/1975 | Ellis | 324/208 |
| 3,946,300 | 3/1976 | Landis | 336/175 X |
| 4,406,999 | 9/1983 | Ward | 324/208 X |
| 4,629,983 | 12/1986 | Boomgaard et al. | 340/870.31 X |

Primary Examiner—Gerard R. Strecker
Attorney, Agent, or Firm—Bauer & Schaffer

[57] ABSTRACT

A displacement measuring apparatus including a variable inductance coil formed of a pair of coils, on a core of predetermined length made of a material having high magnetic permeability. The pair of coils are disposed on a core adjacent to each other in their axial directions and are covered by a metal sleeve of substantially the same length of one of the coils. A detecting circuit is provided including a high frequency oscillator and a rectifier and is connected to the variable inductance coil, wherein when the metal sleeve is slidably moved, the detecting circuit generates a direct current voltage in correspondence with the displacement of the metal sleeve.

5 Claims, 7 Drawing Sheets

VARIABLE INDUCTANCE DISPLACEMENT MEASURING DEVICE WITH SLIDABLE METAL SLEEVE AND FERRITE BEAD CORE

BACKGROUND OF THE INVENTION

1. Field of the Invention

The present invention relates generally to displacement measuring apparatus and, more particularly, is directed to a displacement measuring apparatus for detecting and measuring the amount of displacement of machine apparatus, inspection apparatus and the like.

2. Description of the Prior Art

A machine apparatus utilizes various kinds of scales to electrically measure the displacement amount of an object. The prior-art scale is large in size and is expensive, which limits the application field thereof. When the amount to be measured is relatively small, the displacement measuring apparatus making use of a differential transformer, as shown in FIG. 1, is frequently used. However, the displacement measuring apparatus using the differential transformer cannot overcome the following three shortcomings.

According to the first problem, coils 1 and 2 are coaxially disposed and a core 3 is movable through the inside of the coils 1 and 2. This makes the full length of the apparatus long as compared with the length of each of the coils 1 and 2, forming the differential transformer. Thus, the displacement measuring apparatus is not suitable to measure a large or long displacement.

According to the second problem, since the differential transformer is formed of the two coils 1 and 2 disposed in the axial direction, the total length of the two coils 1 and 2 is increased so that it is about three times the length of the displacement measuring range.

According to the third problem, the core 3 is movable through the insides of the two coils 1 and 2, and the core 3 is supported in a cantilever-fashion. Thus, the displacement measuring apparatus does not have the strength to resist vibration.

OBJECTS AND SUMMARY OF THE INVENTION

Accordingly, it is an object of the present invention to provide an improved displacement measuring apparatus that can remove the above-mentioned defects inherent in the prior art.

Specifically, an object of the present invention is to provide a displacement measuring apparatus which can be made small in size.

Another object of the present invention is to provide a displacement measuring apparatus which is firm in construction and which is strong against vibration.

A further object of the present invention is to provide a displacement measuring apparatus which can keep a coil and a metal sleeve in a non-contact relation with ease.

Yet a further object of the present invention is to provide a displacement measuring apparatus which can maintain desired output voltage with good linearity and stability.

Still a further object of the present invention is to provide a displacement measuring apparatus which can be applied to a wide variety of application fields such as a level meter, a flow meter and the like.

Still another object of the present invention is to provide a displacement measuring apparatus which is suitably applied to apparatus such as a cylinder, a robot and an automatic machine having a small space to mount the displacement measuring apparatus.

In accordance with an aspect of the present invention, there is provided a displacement measuring apparatus comprising:

a variable inductance coil having a pair of coils, each wound by a predetermined length and disposed adjacent to each other in their axial directions, a core made of a material having high magnetic permeability and incorporated in the coils, and a metal sleeve of substantially the same length of one of said coils which is provided to cover said coils so as to become slidable; and a detecting circuit including a high frequency oscillator and a rectifier and being connected to said variable inductance coil, wherein when said metal sleeve is slidably moved, said detecting circuit generates a direct current voltage in correspondence with a moving amount of said metal sleeve.

In accordance with other aspect of the present invention, there is provided a displacement measuring apparatus comprising:

a variable inductance coil having a first coil of a predetermined length wound around a first core, said first coil being covered with a slidable first metal sleeve of substantially the same length as that of said first coil;

a fixed inductance coil having a second coil of a predetermined length wound around a second core, said second coil being fixedly covered with a second metal sleeve of substantially the same or shorter length as that of said second coil; and a detecting circuit including a high frequency oscillator and a rectifier and connected to said variable inductance coil and to said fixed inductance coil, wherein said fixed inductance coil is located distant from said variable inductance coil so that when said first metal sleeve is moved, said detecting circuit generates a direct current voltage corresponding to a displaced amount of said first metal sleeve.

In accordance with a further aspect of the present invention, there is provided a displacement measuring apparatus comprising:

a variable inductance coil having a coil of a predetermined length wound around a core, said first coil being covered with a slidable metal sleeve of substantially the same length as that of said coil;

a fixed inductance element having the same temperature characteristic as that of said variable inductance coil; and a detecting circuit including a high frequency oscillator and a rectifier and being connected to said variable inductance coil and to said fixed inductance element, wherein said fixed inductance element is located distant from said variable inductance coil and an inductance value of said fixed inductance element is selected to be equal to an inductance value of said variable inductance coil when said metal sleeve is fully inserted into said coil so that when said metal sleeve is slidably moved, said detecting circuit generates at its output side a direct current output corresponding to a displaced amount of said metal sleeve.

The above, and other objects, features and advantages of the present invention will become apparent from the following detailed description of illustrative embodiments when read in conjunction with the accompanying drawings, wherein like reference numerals are used to designate the same or similar elements and parts in the several views.

Figure 13A:
FIGS. 13A and 13B are, respectively, diagrams schematically showing variable inductance coils according to the present invention.
Figure 13B:
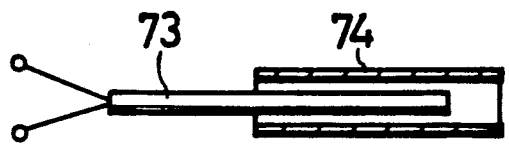
Figure 14A:
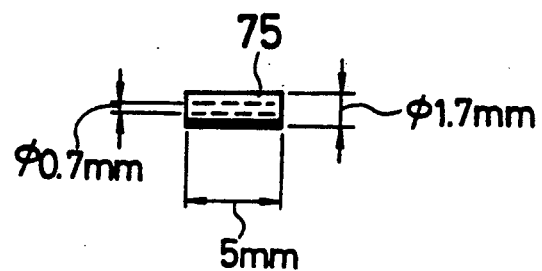
Figure 14B:
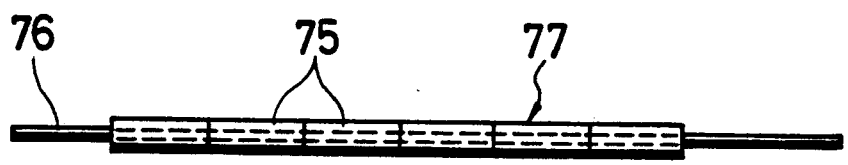
Figure 15:
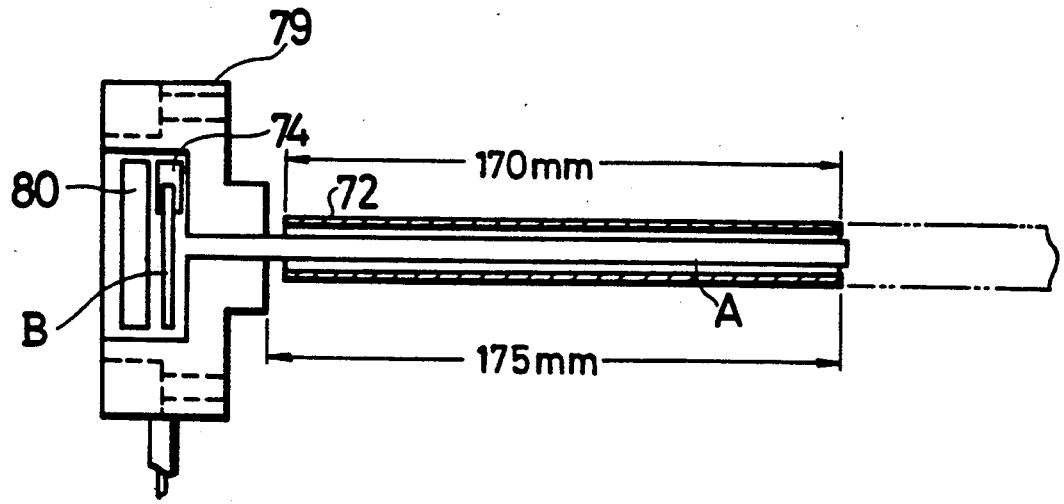
Figure 16:
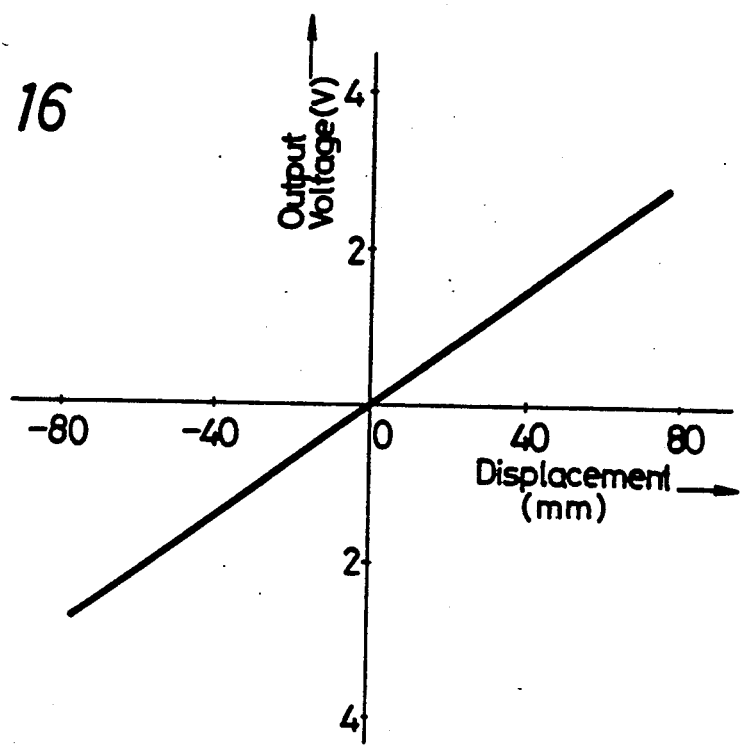
Figure 17:
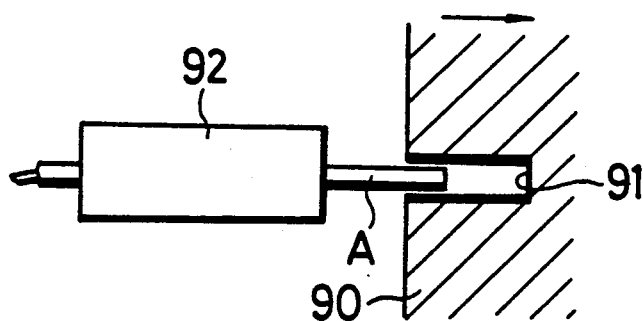
Figure 18:
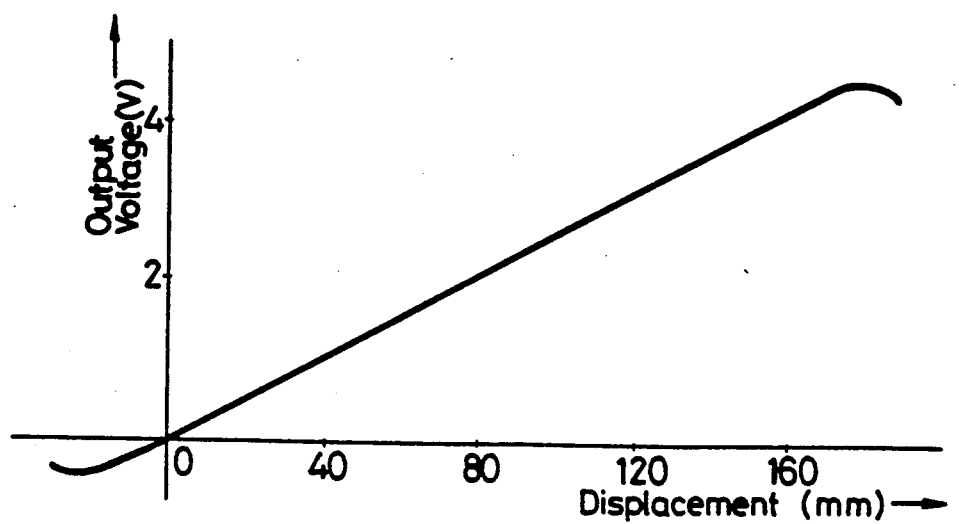

Each of FIGS. 14A and 14B is a schematic diagram showing a main portion of the variable inductance coils shown in FIGS. 13A and 13B;

FIG. 15 is a cross-sectional view illustrating a further embodiment of the present invention;

FIG. 16 is a graphical representation of a displacement detecting characteristic according to the embodiment shown in FIG. 15;

FIG. 17 is a schematic diagram showing yet a further embodiment of the present invention; and FIG. 18 is a graphical representation of a displacement detecting characteristic versus an output voltage according to the present invention.

DETAILED DESCRIPTION OF PREFERRED EMBODIMENTS

The present invention will hereinafter be described in detail with reference to the drawings.

Figure 2:
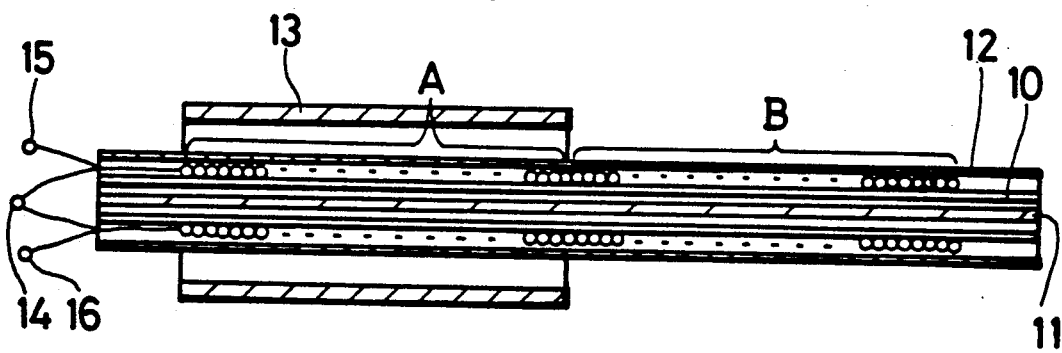
FIG. 2 is a cross-sectional view illustrating a fundamental structure of a variable inductance coil used in the present invention.

FIG. 2 is cross-sectional view illustrating a fundamental structure of a variable inductance coil used in the present invention.

Figure 3:
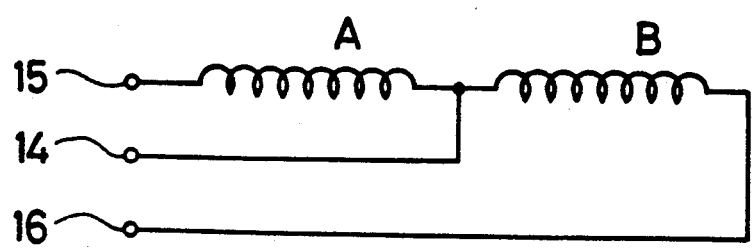
FIG. 3 is a diagram schematically showing an electrical connection of the variable inductance coils shown in FIG. 2.

Referring to FIG. 2, it will be seen that an insulating copper wire having a diameter of 0.2 mm is uniformly wound around a quartz tube 10. The tube 10 has a full length of, for example, 110 mm and an outer diameter of 2.4 mm. The wire is wound to form a coil A, beginning at 10 mm from the left end of the tube and over the length of 50 mm. In this case, the winding has 210 turns. The same insulating copper wire is similarly wound to form a coil B adjacent to the coil A around the quartz tube 10 to form a coil B adjacent the coil A over a similar length of 50 mm. A core 11 of the same length as that of the quartz tube 10, i.e., 110 mm long, made of a material having high magnetic permeability is inserted and secured in the tube 10. The core 11 is a thin permalloy tube having, for example, an outer diameter of 1.2 mm and an inner diameter of 0.7 mm. This permalloy tube undergoes the heat treatment and electrostatic painting using epoxy powders so that it may be protected from aging and the like. A shrink tube covers the outside of the coils A and B to form a protective tube 12. The protective tube 12 may be made of a quartz tube or an epoxy glass tube. A metal sleeve 13 for example, a brass tube having the same length (50 mm) as that of the coil A or B, is placed over the protective tube 12. For the sake of the following description, as seen for example in FIG. 7, the outer diameter of the metal sleeve 13 is 6 mm or 5 mm, whereas the inner diameter thereof is 5 mm or 4 mm. As shown in FIG. 3, one end of each of the coils A and B are connected together to form a junction, and three lead wires lead out of the junction and the free ends of the coils A and B so as to be connected to terminals 14, 15 and 16 provided at one end of the quartz tube 10 (see FIG. 2).

Figure 4:
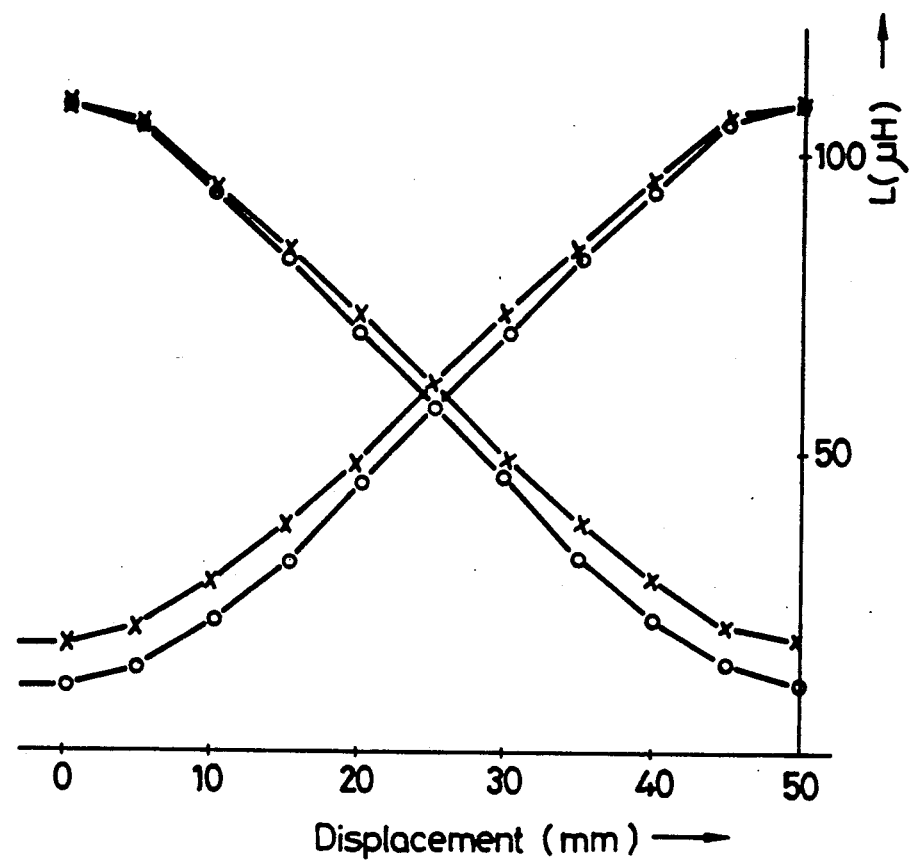
FIG. 4 is a graphical representation of a variable inductance characteristic of the coils shown in FIG. 2.

FIG. 4 is a graphic representation showing how the inductances (L) of the coils A and B are varied when the metal sleeve 13 shown in FIG. 2 is displaced in a range of 50 mm. In FIG. 4, a cross mark plots the above-mentioned inductances when the inner diameter of the metal sleeve 13 is 5 mm, while an open circle plots the same when the inner diameter of the metal sleeve 13 is 4 mm. When the displacement of the metal sleeve 13 exceeds 50 mm, then the metal sleeve 13 disengages from the coil A, resulting in the maximal constant inductance of the coil A. As is apparent from FIG. 4, the inductances of the coils A and B are symmetrically varied in the opposite direction, making it possible to use a detecting circuit of a differential type as a detecting circuit for inductances.

Figure 5:
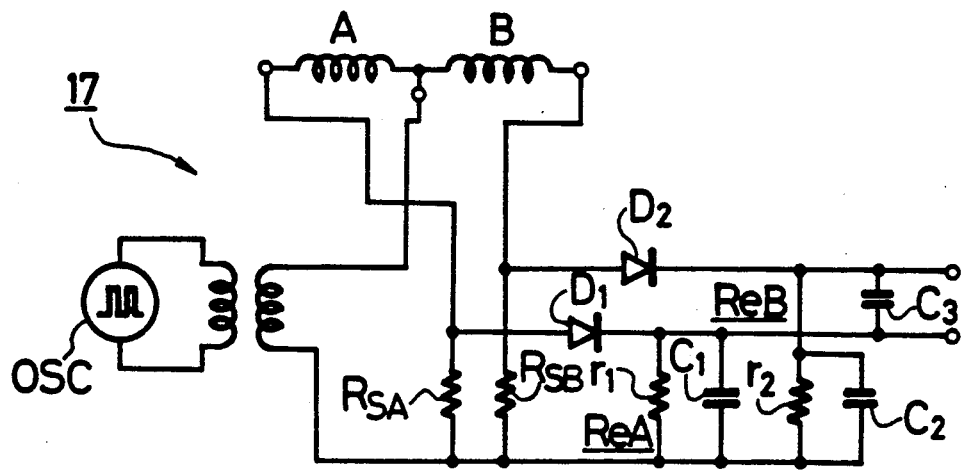
FIG. 5 is a schematic diagram showing an example of a detecting circuit used in the present invention.

The schematic diagram forming FIG. 5 shows an example of a detecting circuit that is generally designated by reference numeral 17. In the detecting circuit 17, a high frequency voltage from a high frequency oscillator OSC is applied to the coils A and B in the opposite direction and alternate current voltages across resistors $R_{SA}$ and $R_{SB}$ varied with the change of the inductances of the coils A and B are converted to direct current voltages by rectifiers ReA and ReB each including a smoothing circuit and a difference voltage therebetween is generated as an output voltage across a capacitor $C_3$. In this case, the rectifier ReA comprises a diode $D_1$, a resistor $r_1$ and a capacitor $C_1$, whereas the rectifier ReB comprises a diode $D_2$, a resistor $r_2$ and a capacitor $C_2$, as shown in FIG. 5. The detecting circuit 17 is not limited to the above-noted differential type but the differential type detecting circuit is used in the present invention because it is excellent in linearity and temperature characteristic.

Figure 6:
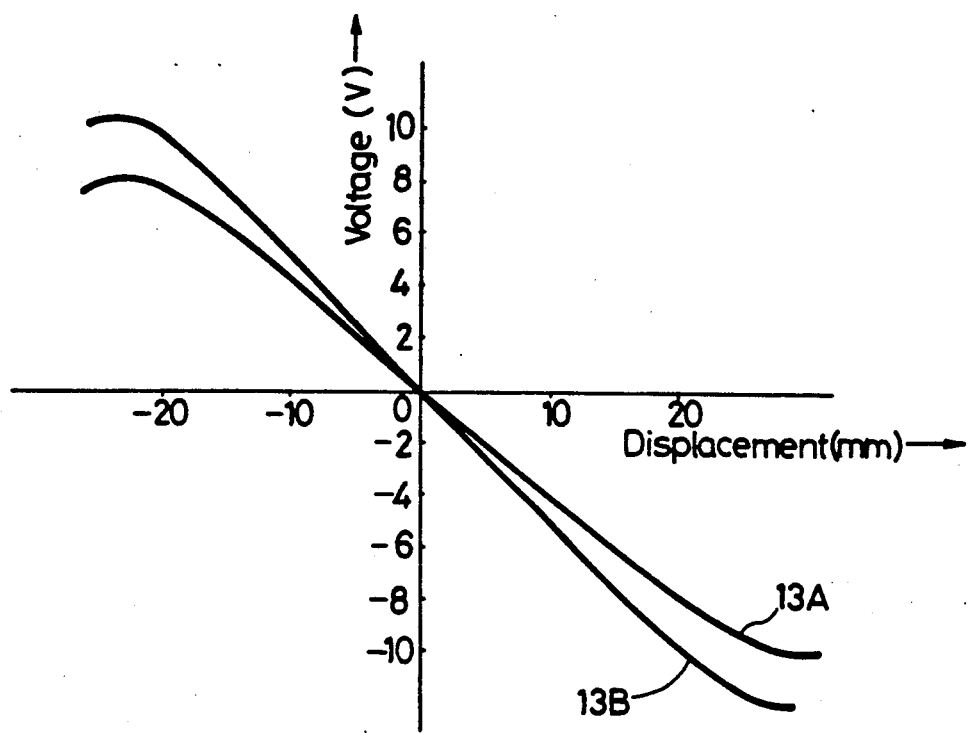
FIG. 6 is a graphical representation of an output characteristic presented by a combination of the coils of FIG. 2 and the detecting circuit of FIG. 5.

FIG. 6 is a graphic representation of voltage versus displacement, wherein output voltages from the detecting circuit 17 shown in FIG. 5 are plotted in accordance with the displacement of the metal sleeve 13 while the two coils A and B are fixed. The graph of FIG. 6 demonstrates characteristics of the displacement measuring apparatus of the invention. In FIG. 6, curves 13A and 13B respectively represent characteristics in cases where the inner diameters of the metal sleeve 13 are selected to be 5 mm and 4 mm.

Figure 7:
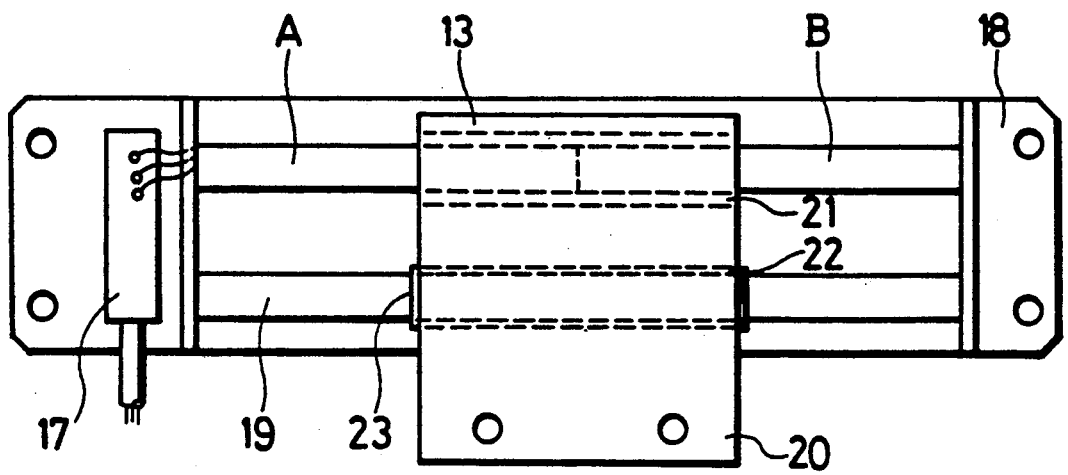
FIG. 7 is a plan view of a first embodiment of a displacement measuring apparatus according to the present invention.

A plan view forming FIG. 7 illustrates a first embodiment of a displacement measuring apparatus according to this invention. In the embodiment of FIG. 7, the coil protective tube (or cover), coil attaching metal fittings and the like are not shown for simplicity.

Referring to FIG. 7, it will be seen that the coils A and B and a guide rod 19 are secured to a base plate 18 in parallel to each other. A sliding member o slider 20 made of a metal (for example, brass) is attached to the guide rod 19 so as to be freely slidable. The slider 20 is formed of a thick metal plate that is square in cross section, and the slidable length of the slider 20 is the same as the length of the coil A or B. The slider 20 has an opening 21 (for example, 5 mm in inner diameter) formed therethrough to introduce the coils A and B therein and also has an opening 22 formed therethrough to accept a metal bearing 23 of the guide rod 19. While the metal sleeve 13 is formed as the tube in the example of FIG. 2, it may be an opening so long as the inner surface thereof is tubular or its outer shape has no relation. The detecting circuit 17 is assembled as a part of the base plate 18.

Figure 1:
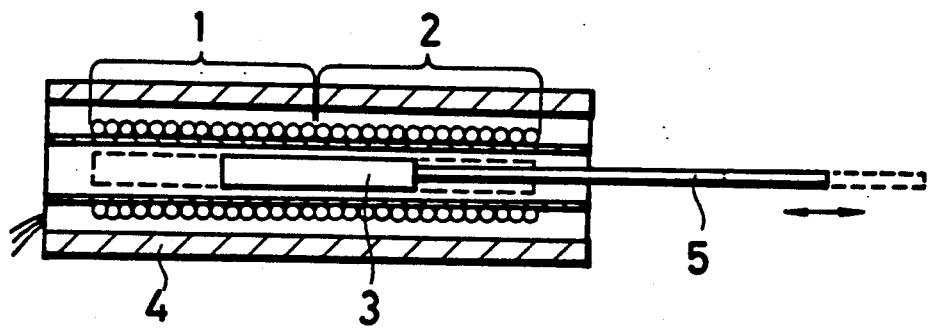
FIG. 1 is a cross-sectional view of a prior-art displacement measuring apparatus that utilizes a differential transformer.

The prior-art differential transformer is constructed such that as shown in FIG. 1 the coils 1 and 2 of substantially the same length are disposed in series in the ceramic cylinder on which the winding is made, which is the same as the arrangement of the present invention. In this conventional differential transformer, the length of the core 3 movable through the inside of the coils 1 and 2 is substantially equal to the length of the coil 1 or 2. However, the core 3 is slidably moved through the inside of the coils 1 and 2 by a thin linkage rod 5 so that the full length of the differential transformer becomes considerably longer than the displacement amount. Further, one end of the core 3 is fixed to the linkage rod 5 and the other end thereof is made free so that the core 3 suffers from vibration from a mechanical standpoint. Therefore, the prior-art differential transformer cannot be used where large vibration occurred. This problem becomes serious particularly when the displacement amount is more than 100 mm.

On the other hand, in the embodiment of the present invention shown in FIG. 7, the coils A and B are secured to the base plate 18 at their respective free ends, the slider 20 is engaged with the guide rod 19 so as to be freely slidable without contacting the coils A and B and the maximal displacement of the slider 20 is not only equal to the length of the coil A or B but also falls within a range of the full length of the coils A and B so that the full length of the displacement measuring apparatus of the invention is substantially equal to the full length of the coil A or B. In addition, the apparatus has a firm structure and is strong against the vibration.

Furthermore, according to the prior-art differential transformer, when the core 3 is disengaged from the coil 1 or 2, this results in the minimal inductance and the inductance is increased in proportion to the insertion length of the core 3 to the coil 1 or 2 and the change of the inductance becomes substantially the same as that shown in FIG. 4.

According to the present invention, however, as shown in FIG. 2, the core 11 having the length longer than the length of the coil including the coils A and B is previously secured within the coils A and B, which is covered with the metal sleeve 13 and the metal sleeve 13 is displaced so that the metal sleeve 13 acts as a short-circuiting secondary coil provided outside the coils A and B, thus the inductance of the coil covered with the metal sleeve 13 is decreased considerably. When the metal sleeve 13 covers the whole of coil A or B, the inductance of the coil A or B demonstrates the minimal value.

The metal sleeve 13 used in the present invention may be made of proper metals such as brass, aluminum, copper or the like. From a characteristic standpoint, any metal has conductivity and presents very small difference when applied to the metal sleeve 13. If the metal sleeve 13 is made of iron, there is achieved an effect that the inductance of the coil is increased by the influence of magnetic permeability. In the high frequency coil whose frequency is several 100s of kilo hertz, the effect of the short-circuiting secondary coil is so powerful as to vary the inductance of the coil in a substantially similar manner to that of FIG. 4. Further, the degree of inductance depends on the relationship between the size of the coils A, B and the size of the opening 21 in the metal sleeve 13 because the coupling coefficient between the windings of the coils A, B and the opening 21, acting as the short-circuiting secondary coil, is changed with the size of the opening 21. While the inner diameter of the opening 21 is selected to be 4 mm and 5 mm as represented by the open circle and the cross mark in FIG. 4, the size of the opening 21 of the metal sleeve 13 is important but the outer form of the metal sleeve 13 is not so important.

When the length of the coils A and B is sufficiently large as compared with the diameter of the coils A and B and the inner diameter of the opening 21 of the metal sleeve 13, the inductance of the coils A and B is linearly changed. At the respective end portions of the coils A and B, the linearity of the inductance deteriorates in a range about twice as large as the inner diameter of the opening 21 of the metal sleeve 13. A so-called end effect cannot be avoided but the range of end effect can be narrowed by reducing the diameter of the coils A and B and the inner diameter of the metal sleeve 13. In order to prevent the range in which the linearity of the inductance deteriorates from being widened by the above-noted end effect, the density of the winding of the coils A and B is partly changed and the length of the metal sleeve 13 is made longer than that of the coil A or B, which can improve the characteristic at the respective end portions of the coils A and B to some extent.

In the detecting circuit 17 shown in FIG. 5, the high frequency oscillator OSC is designed as a pulse oscillator that generates a pulse (pulse width thereof is about 1 microsecond) having a recursive frequency of 20 kHz. If the high frequency oscillator OSC is designed as a sinusoidal wave oscillator instead of the pulse oscillator, then the apparatus of the invention is similarly operated. If on the other hand the high frequency oscillator OSC is formed as the pulse oscillator, then a current to be consumed can be considerably reduced and a peak voltage can be increased. In a case of the differential transformer, the oscillation frequency of the detecting circuit 17 is generally 50 Hz or 1 kHz. If the oscillation frequency is increased as described in the present invention, then the number of turns of the coils A and B can be reduced (satisfactory result is brought about by one layer coil according to the experiments), the cross area of the core can be reduced and the response speed as the displacement measuring apparatus can be increased.

Figure 8:
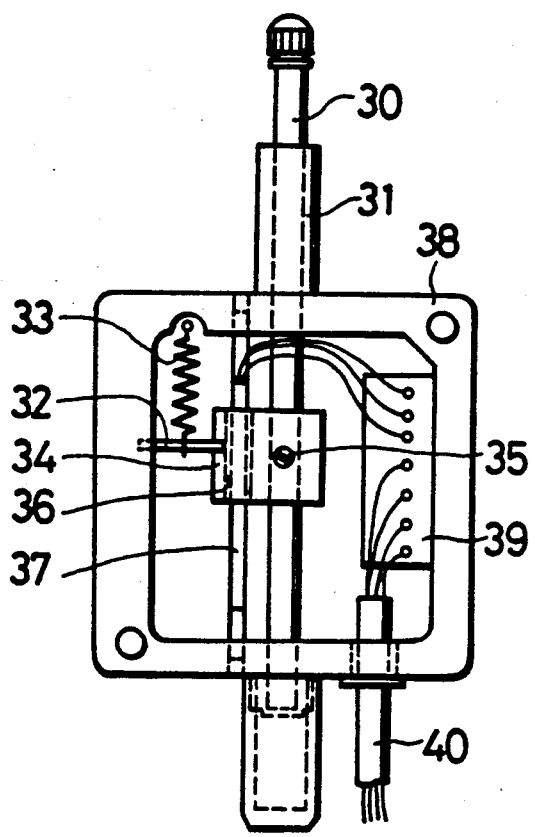
FIG. 8 is a plan view of a second embodiment of a displacement measuring apparatus according to the present invention.

FIG. 8 is a plan view illustrating a second embodiment of a displacement measuring apparatus according to the present invention. In this embodiment, a lid is removed from the apparatus to provide a better understanding of the present invention. The apparatus shown in FIG. 8 looks like a dial gauge externally.

Figure 9:
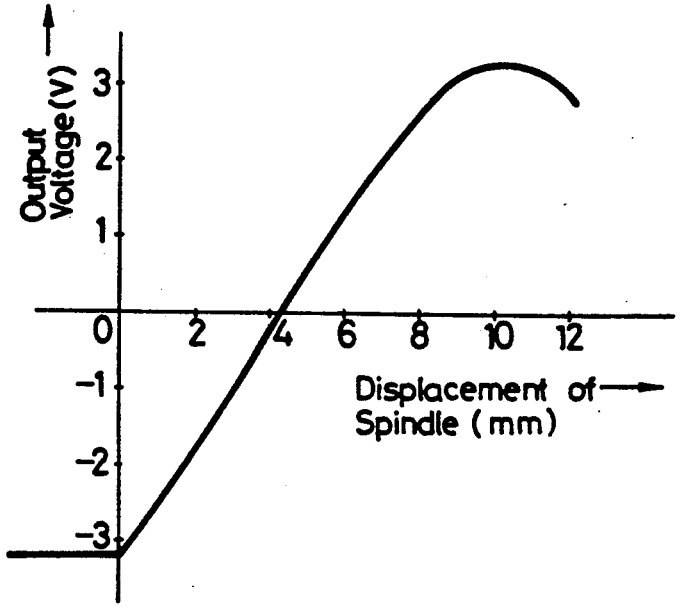
FIG. 9 is a graphical representation of an output characteristic presented by the displacement measuring apparatus shown in FIG. 8.

As shown in FIG. 8, there is provided a housing 38 in which a spindle 30, supported in a bearing 31, is moved therein. The slidable length of spindle 30 is, for example, 12 mm. The spindle 30 is restricted in rotation by a pin 32 that is slidably provided for the housing 38 and is returned to the original position by a spring force of a spring 33 extended between the housing 38 and the pin 32. The spindle 30 is engaged with a sliding member or slider 34 that is connected to the pin 32. The slider 34 is fixed to the spindle 30 by a screw 35. The slider 34 has an opening of 4 mm in inner diameter formed therethrough as a metal sleeve 36. A coil 37 (formed of coils A and B shown in FIG. 2) is fixed to the housing 38 through this opening 36. The coil 37 is 3 mm in outer diameter and is located within the opening 36 of the slider 34 so as not to come in contact with the opening 36. A detecting circuit 39, similar to the detecting circuit 17 shown in FIG. 5, is provided within other portion of the housing 38 by means of the molding-process of epoxy resin. The detecting circuit 39 is connected with the coil 37 and a cable 40, from which is derived an output voltage of about ±4 Volts. In this embodiment of the present invention, the winding width of the coil 37 and the length of the slider 34 demonstrate various characteristics whose sensitivities are different. FIG. 9 illustrates an example thereof.

This type of displacement measuring apparatus suitably utilizes a metal sleeve slide system of the present invention. In this case, when the position of the slider 34 is displaced by turning the screw 35 loose, a midpoint of the output curve in FIG. 9 can be shifted easily.

Figure 10:
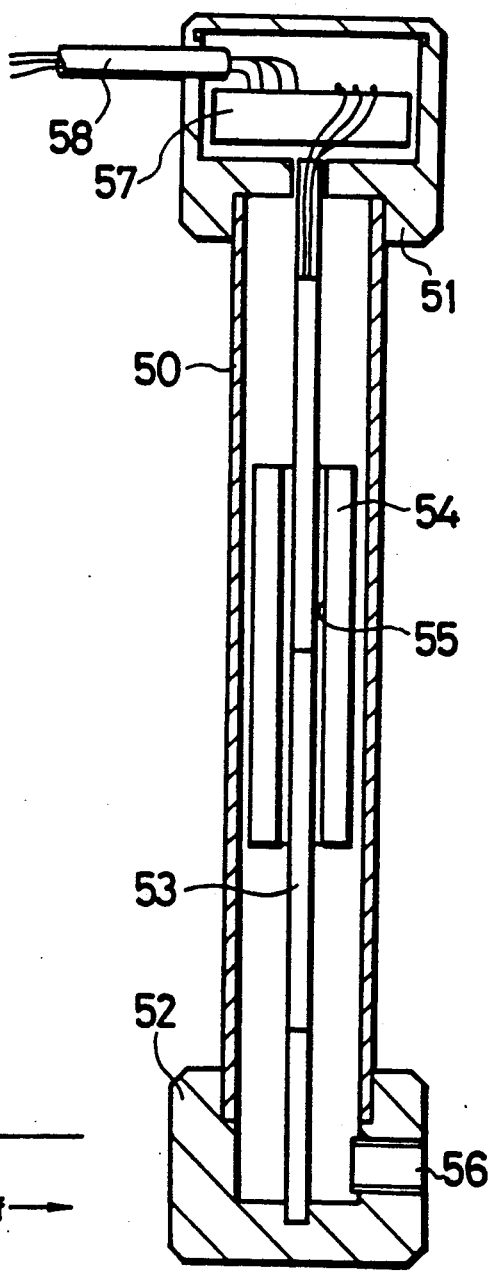
FIG. 10 is a cross-sectional view illustrating a third embodiment of a displacement measuring apparatus according to the present invention.

FIG. 10 is a cross sectional view illustrating a third embodiment of the present invention in which the displacement measuring apparatus of the invention is applied to a level meter.

Referring to FIG. 10, it will be seen that end fittings 51 and 52 are attached to respective upper and lower ends of an outer tube 50 made of glass or metal, and a coil 53 (formed of coils A and B shown in FIG. 2) is inserted int the outer tube 50 and is fixed at the upper and lower ends thereof by the upper and lower fittings 51 and 52. A float 54 through which the coil 53 passes is provided within the outer tube 50 so as to become freely slidable. The float 54 is made of a metal and is a double hollow cylinder in construction whose both ends are sealed and has an opening 55 having an inner diameter of, for example, 5 mm formed therethrough. The opening 55 forming the above-mentioned metal sleeve. An inlet 56 is formed through the lower end fitting 52 through which there is supplied a fluid to the inside of the outer tube 50. A detecting circuit 57 similar to the detecting circuit 17 shown in FIG. 5 is disposed in the upper end fitting 51, whereby a direct current voltage is generated in a cable 58 connected to the coil 53. The displacement measuring apparatus of this embodiment utilizes the coil of 100 mm long (each of the coils A and B is 50 mm long) shown in FIG. 2 to demonstrate the characteristics shown in FIG. 6.

In this embodiment, if the outer tube 50 is tapered, the apparatus can be applied to a flow meter.

According to the present invention, as set forth above, there are achieved the following large effects.

Since the displacement amount of the metal sleeve falls within a range of the length of the coil, the full length of the apparatus can be reduced to be substantially the same as the length of the coil.

The displacement measuring apparatus of the invention is firm in construction and is strong against the vibration. Further, according to the displacement measuring apparatus of the invention, the coil and the metal sleeve can easily be arranged so as not to come in contact with each other. Furthermore, the displacement measuring apparatus of the invention can be applied to the level meter and the flow meter, so the present invention is useful in a wide variety of application fields.

Figure 11:
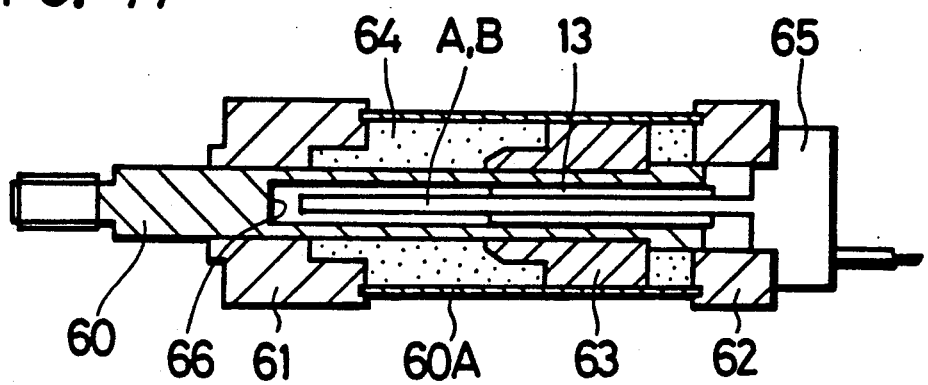
FIGS. 11 and 12 are, respectively, cross-sectional views illustrating examples that the displacement measuring apparatus of the invention are applied to hydraulic cylinders.

FIG. 11 is a cross sectional view illustrating a further embodiment of the present invention, in which the displacement measuring apparatus of the invention is applied to, for example, a hydraulic cylinder.

In FIG. 11, reference numeral 60A designates a cylinder, 60 a piston rod, 61 a rod cover, 62 a head cover, 63 a piston and 64 oil. The piston rod 60 has at its center formed an opening 66 of more than 100 mm long, into which there are inserted the coils A and B similar to those shown in FIG. 2 and which are secured to a detector casing 65 that includes the above-mentioned detecting circuit 17. The metal sleeve 13 is fixed to the piston rod 60 within the opening 65 so as to enclose the coils A and B.

The inevitable problem is then presented that the depth of the opening 66 formed through the piston rod 60 must be about 2.5 times as long as the stroke of the piston 63. Further, it is frequently observed that in the cylinder in which the stroke of the piston 63 is more than 100 mm, the required depth of the opening 66 exceeds the full length of the piston rod 60.

Figure 12:
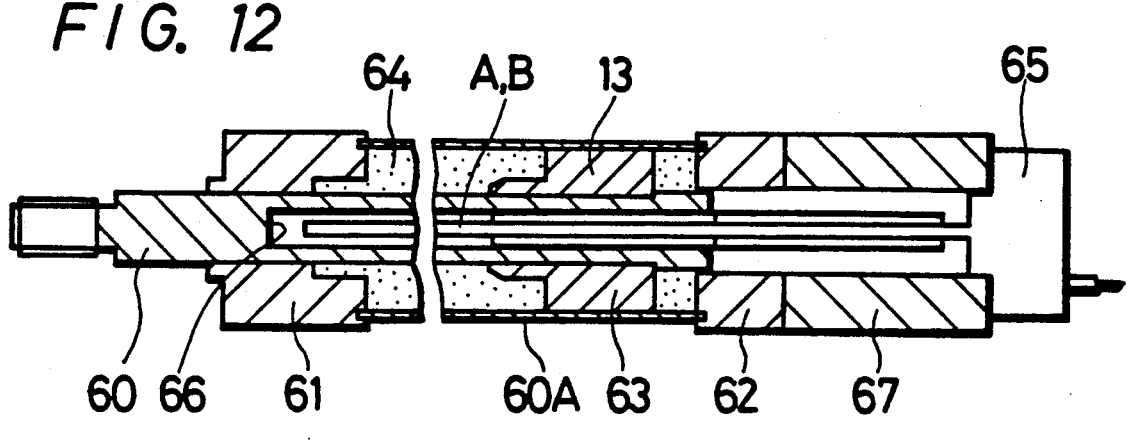

FIG. 12 is a cross-sectional view illustrating another example of the invention in which the displacement measuring apparatus of the invention is also applied to the hydraulic cylinder. In this example, the hydraulic cylinder is designed to remove the defect that is provided such as when the coils A and B are too long. In FIG. 12, like parts corresponding to those of FIG. 11 are marked with the same references and therefore need not be described in detail. In this case, referring to FIG. 12, it will be seen that a flange 67 is provided between the head cover 62 and the detector casing 65. Flange 67, however, provides a cumbersome assembly and a complicated arrangement.

A further embodiment of a displacement measuring apparatus according to the present invention, which can solve the above-mentioned problems, will hereinafter be described in detail with reference to FIGS. 13 to 17.

FIGS. 13A and 13B are schematic diagrams illustrating examples of a variable inductance coil A and a fixed inductance coil B, respectively.

Referring to FIG. 13A, it will be seen that the variable inductance coil A is formed of a coil 71 that is directly wound by a predetermined length around a ferrite core that will be described later. A metal sleeve 72 of substantially the same length as that of the coil A covers the coil A so as to become slidable therealong.

Referring to FIG. 13B, it will be seen that the fixed inductance coil B is formed of a coil 73 that is directly wound by a predetermined length around a ferrite core that will be described later. A metal sleeve 74 having a length substantially the same or shorter than that of the coil B covers the coil B in a fixed fashion.

In accordance with this embodiment, the cores incorporated within the coils A and B are beads 75 of sintered ferrite, instead of permalloy of high magnetic permeability, as shown in FIGS. 14A and 14B. Each of the sintered ferrite beads 75 is formed as a tube of 5 mm long and which has an outer diameter of 1.7 mm and an inner diameter of 0.7 mm as, for example, shown in FIG. 14A. The magnetic permeability thereof is selected to be 35 H/m, which is the minimal value of the sintered bead that is available on the market. As shown in FIG. 14B, a plurality of beads 75 are inserted with a wire 76 made of phosphate bronze having an outer diameter of, for example, 0.68 mm and are then fixed to become a predetermined length by a bonding agent, thus resulting in the ferrite core 77 being produced. The coil 71 or 73 is directly wound around the ferrite core 77. Further, the coil can be directly wound around the ferrite core 77 so that the quartz tube 10 employed in FIG. 2 becomes unnecessary.

FIG. 15 is a cross sectional view illustrating the assembled states of the coils A and B as another embodiment of the displacement measuring apparatus according to the present invention.

Referring to FIG. 15, it will be seen that the coil A protrudes from a detector casing 79 so as to oppose the object to be measured, while the coil B is incorporated within the detector casing 79 as a kind of dummy coil together with a detector 80 that includes the above-mentioned detecting circuit. The metal sleeve 72 covers the coil A so as to become slidable therealong and the metal sleeve 74 is fixed so as to cover a part of the coil B.

In the embodiment of FIG. 15, the length of the coil A is selected to be 175 mm and the length of the metal sleeve 72 is 170 mm because linear range (linearity of ±1%) of a displacement detecting characteristic is 150 mm.

Incidentally, the detecting circuit in the detector 80 used in the above-mentioned embodiment may be the same as the detecting circuit 17 shown in FIG. 5.

According to this embodiment, the detecting circuit 17 of differential type shown in FIG. 5 is used and the coil B is fixed as the dummy coil so that the change of inductance takes place only in the coil A to generate a half of the output voltage as compared with the foregoing examples. However, even after the half of the output voltage is generated, the output voltage becomes more than ±2V and reaches ±3V as will become apparent from the displacement detecting characteristic of FIG. 16. Thus, no problem occurs particularly in the output voltage.

Although the coil B is fixed as the dummy coil and hence the linearity of the output voltage is poor, if a correction coil of a certain length is wound around the coil B, there is achieved a linearity similar to that provided by the arrangement shown in FIG. 2, thus removing the problem of poor linearity. In the winding of the correction coil, the correction coil is wound around the coil B and then the linearity is examined several times in a so-called cut-and-try fashion.

Further, stability of the output voltage relates to the coil B provided as the dummy coil so that in this embodiment the following coil is formed as an example of the coil B. Specifically, a conductive wire having a diameter of 0.1 mm is wound around the ferrite core 77 (15 mm long), shown in FIG. 14, 160 times to provide a coil. Then, this coil is covered with the metal sleeve 74 (made of SUS-304) having an inner diameter of 2.5 mm and a length of 10 mm. Although the thus made coil is short in length, this coil has the same structure and is made by the same material as that of the coil A used as the main coil. The adjustment of the inductance is effected by slidably moving the coil B from and into the metal sleeve 74 and, the coil B is fixed by a resin when best inductance is provided. The above-mentioned coil B is incorporated within the detector casing 79 together with the detector 80. As the temperature coefficient becomes about $2 \times 10^{-4}/°$ C. and the stability of output voltage becomes satisfactory. In addition, instead of the dummy coil B, it is possible to use an element that has a temperature characteristic substantially similar to that of the coil A as well as a proper inductance.

While the present invention is applied to the cylinder by way of example in the above-noted embodiment, the present invention is not limited to the above-mentioned embodiment but may be applied to such a variation thereof as follows. As, for example, shown in FIG. 17, if an object to be measured is a movable member 90, an opening 91 is formed through the movable member 90, into which there is inserted the coil A to measure the displacement amount of the movable member 90. In this case, if the movable member 90 is made of copper, aluminum or bronze, the opening 91 itself can be formed as the metal sleeve 72 that is substantially movable. If the movable member 90 is made of iron, the metal sleeve 72 is pressed into and fixed to the opening 91. In FIG. 17, reference numeral 92 designates a detector similar to the detector 80 in FIG. 15.

According to the above embodiment of the present invention, as described above, since the pair of coils are wound around the cores by the predetermined length, one of them is covered with the slidable metal sleeve to provide the variable inductance coil, the other is covered fixedly with the metal sleeve to provide the fixed inductance coil, the fixed inductance coil is spaced apart from the variable inductance coil provided opposing the side of the object to be measured and the variable inductance coil is substantially disposed at the side of the object to be measured, the length of the coil used in the displacement measuring apparatus can be reduced substantially by a half while a desired output voltage, linearity and stability can be maintained, which makes the apparatus small in size. Therefore, the displacement measuring apparatus of the above embodiment according to the present invention is very useful for being applied to a cylinder, a robot, an automatic machine or the like that has a small mounting space for the apparatus.

The output voltage of the detecting circuit 17 of the differential type shown in FIG. 5 is proportional to a difference between the inductances of the coils A and B. Thus, when the metal sleeve 72 is fully inserted into the coil A (up to the detector casing 79 side in FIG. 15) as, for example, shown in FIG. 15, if the inductance values of the coils A and B are made equal, the output of the detecting circuit, for example, 17 becomes zero, which is plotted at 0V (original point) of FIG. 18 which shows a similar characteristic to that shown in FIG. 16. Since the coil B is fixed as the dummy coil in the example shown in FIG. 15, the change of the inductance depends only on the coil A. Thus, when the metal sleeve 72 is gradually pulled out from the condition that it is fully inserted into the coil A, the inductance of the coil A is increased in proportion to the movement amount of the metal sleeve 72 so as to increase the difference relative to the inductance of the coil B. Therefore, the output voltage of the detecting circuit 17 presents a characteristic which is gradually increased to the plus side from a 0V provided substantially as the original point as shown in FIG. 18. In this case, as is apparent from FIG. 18, the output voltage reaches more than +4V so that no problem takes place particularly in the output voltage.

Further, although the linearity of the output voltage at that time is slightly degraded because the coil B is fixed as the dummy coil, if the coil B is modified by a correction coil of a suitable length, the linearity of the output voltage can be improved. The winding of the correction coil may be effected proper times in a cut-and-try fashion as described above.

Furthermore, since the inductance value of the inductance coil A is selected to be equal to that of the coil B when the metal sleeve 72 is fully inserted into the coil A, the original point of the characteristic curve can be determined substantially at the end of stroke, or one end (0V) of the characteristic curve as shown in FIG. 18. Therefore, the displacement measuring apparatus of the present invention is particularly useful as an absolute scale for measuring the length.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim as my invention:

1. A displacement measuring apparatus comprising:
a variable inductance coil formed of a pair of coils, each being wound at a predetermined length and disposed adjacent to each other in their axial directions about a core made of a material having high magnetic permeability and being covered by a protective tube and a slidable metal sleeve disposed over said inductance coil, said sleeve being of substantially the same length of one of said coils and being coupled to an object to be measured for movement in response thereto, said core being made of a metal wire and a plurality of ferrite beads connected in series and covering said metal wire; and
a detecting circuit comprising a high frequency pulse oscillator, the said pair of coils of said variable inductance coil, a pair of resistors, and a pair of rectifiers, said pair of coils being connected together at their one ends to one output terminal of said oscillator, said pair of resistors being connected at their one ends to the other ends of said pair of coils, respectively, while being connected together at their other ends to the other output terminal of said oscillator, said pair of rectifier rectifying voltages produced across said pair of resistors and delivering a difference voltage therebetween, wherein when said metal sleeve is slidably moved, said detecting circuit generating a direct current voltage in correspondence with the displacement of said metal sleeve.

2. The displacement measuring apparatus according to claim 1 in which the lengths of each of said pair of coils are selected equal to each other.

3. A displacement measuring apparatus comprising:
a variable inductance coil having a first coil of a predetermined length wound around a first core, said first coil being covered with a slidable first metal sleeve of substantially the same length as that of said first coil which is coupled to an object to be measured;
a fixed conductance coil having a second coil of a predetermined length wound around a second core, said second coil being fixedly covered with a second metal sleeve of substantially the same or shorter length as that of said second coil, each of said first and second cores being made of a metal wire and a plurality of ferrite beads connected in series and covering said metal wire, said first and second coils being directly wound around said first and second cores, respectively, and each covered with a protective tube, said metal sleeve covering said protective tube with a clearance; and
a detecting circuit comprising a high frequency pulse oscillator, said first and second coils, a pair of resistors, and a pair of rectifiers, said first and second coils being connected together at their one ends to one output terminal of said oscillator, said pair of resistors being connected at their one ends to one other ends of said first and second coils, respectively, while being connected together at their other ends to the other output terminal of said oscillator, said pair of rectifier rectifying voltages produced across said pair of resistors and delivering a difference voltage therebetween, wherein said fixed inductance coil is located distance from variable inductance coil so that when said first metal sleeve is moved, said detecting circuit generates a direct current voltage corresponding to a displaced amount of said first metal sleeve.

4. A displacement measuring apparatus comprising:
a variable inductance coil having a first coil of a predetermined length wound around a core, said first coil being covered with a slidable metal sleeve of substantially the same length as that of said coil, said core being made of a metal wire and a plurality of ferrite beads connected in series and covering said metal wire, said first coil being directly wound around said core and covered with a protective tube, said slidable metal sleeve covering said protective tube with a clearance;
a fixed conductance element having the same temperature characteristic as that of said variable inductance coil; and
a detecting circuit including a high frequency pulse oscillator, said first coil, said fixed inductance element, a pair of resistors, and a pair of rectifiers, said first coil and said fixed inductance element being connected together at their one ends to one output terminal of said oscillator, said pair of resistors being connected at their one ends to the other ends of said first coil and said fixed inductance element, respectively, while being connected together at their other ends to the other output terminal of said oscillator, said pair of rectifier rectifying voltages produced across said pair of resistors and delivering a difference voltage therebetween, wherein said fixed inductance element is located distance from said variable inductance coil and an inductance value of said fixed inductance element is selected to be equal to an inductance value of said variable inductance coil when said metal sleeve is fully inserted into said coil so that when said metal sleeve is slidably moved, said detecting circuit generating at its output side a direct current output corresponding to a displaced amount of said metal sleeve.

5. The displacement measuring apparatus as claimed in claim 4 in which said fixed inductance element is made of a second coil with a predetermined length wound around a second core, said second core being formed of a metal wire and a plurality of ferrite beads connected in series and covering said metal wire, said second coil being directly wound around said core and covered with a protective tube and fixedly covered with a second metal sleeve.

* * * * *

UNITED STATES PATENT AND TRADEMARK OFFICE
CERTIFICATE OF CORRECTION

PATENT NO. : 5,010,298

DATED : April 23, 1991

INVENTOR(S) : Saburo Uemura

It is certified that error appears in the above-identified patent and that said Letters Patent is hereby corrected as shown below:

Column 11, line 64;
    CLAIM 3, line 8 "conductance" should be --inductance--

Column 12, line 8;
    CLAIM 3, line 20 "comprising" should be --including--

Column 12, line 34;
    CLAIM 4, line 12 "conductance" should b e --inductance--

Signed and Sealed this

First Day of September, 1992

Attest:

DOUGLAS B. COMER

*Attesting Officer*     *Acting Commissioner of Patents and Trademarks*